Figure 1:
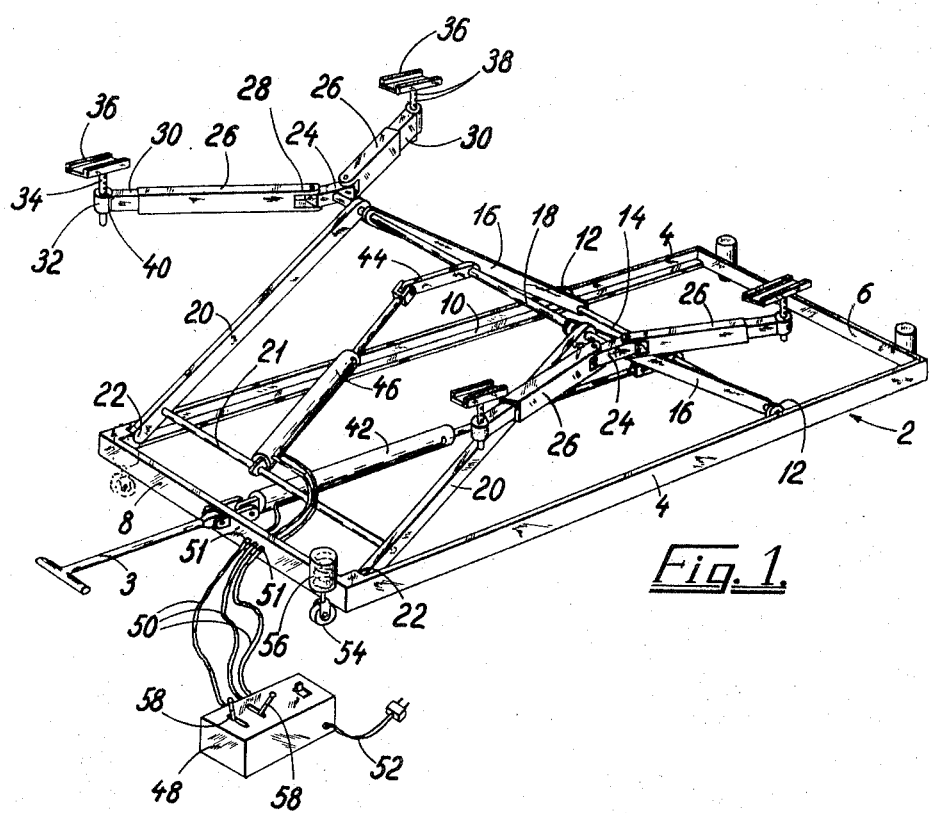

United States Patent [19]
Nielsen

[11] 3,844,421
[45] Oct. 29, 1974

[54] APPARATUS FOR LIFTING AND TILTING AUTOMOBILES

[76] Inventor: Erik Hauberg Skriver Nielsen, Kridthojvej 21, Hojbjerg, Denmark

[22] Filed: Dec. 21, 1972

[21] Appl. No.: 317,302

[52] U.S. Cl. ................. 214/1 A, 187/8.71, 254/8 R
[51] Int. Cl. ............................................. B60p 1/04
[58] Field of Search .................. 214/1 A, 1 D, 1 R; 254/2 R, 2 B, 2 C, 8 R, 8 B, 8 C; 187/8.71, 8.72

[56] References Cited
UNITED STATES PATENTS

| | | | |
|---|---|---|---|
| 2,613,822 | 10/1952 | Stanley | 214/1 D |
| 3,223,251 | 12/1965 | Roths et al. | 214/1 A |
| 3,362,502 | 1/1968 | Clarke | 187/8.72 |
| 3,363,778 | 1/1968 | Larsson | 214/1 A |

FOREIGN PATENTS OR APPLICATIONS

| | | | |
|---|---|---|---|
| 1,113,663 | 12/1955 | France | 254/8 C |

Primary Examiner—Frank E. Werner
Attorney, Agent, or Firm—Craig & Antonelli

[57] ABSTRACT

An apparatus for lifting and tilting vehicles comprising a lifting structure having a base area the length and width of which is of approximately the same magnitude as the longitudinal, distance between the vehicle axles but less than the transverse distance between the vehicle wheels. The lifting structure having an intermediate lifting portion and means operable to effect lifting thereof from a lowered position underneath vehicle to a raised position said lifting portion carrying a vehicle supporting structure which is tiltably mounted on the lifting portion and is connected with control means for adjusting its angular position relatively to the supporting surface of the apparatus.

11 Claims, 2 Drawing Figures

PATENTED OCT 29 1974 3,844,421

APPARATUS FOR LIFTING AND TILTING AUTOMOBILES

The present invention relates to an apparatus for lifting and tilting vehicles, for example, automobiles, primarily for use in car repair workshops.

Many kinds of stationary, normally hydraulic lifts are known for the purpose of lifting a car up to a position which is convenient for carrying out repair work thereon, especially in connection with undercar repairs. Some known lifts are even adapted so as to be able to tilt the car in its raised position, whereby a still more convenient working position may be obtained. These lifts, however, are rather complicated and expensive, and they have been bound to constitute stationary installations anchored to the floor of the workshop. Some movable tilting jacks are known, but they only allow one end or side of the car to be lifted, i.e., not the entire car.

It is the purpose of the present invention to provide an apparatus of the kind referred to, the construction of which is very simple and even well suited for being made as a movable lift.

According to the invention there is provided an apparatus having a base area of substantial size and comprising a raisable support for a car carrier structure which is mounted on said support so as to be tiltable between different fixed positions thereon. The support is preferably made as a trestle consisting of two inclined side frames hinged to each other along their common top edge and having means for adjusting the distance between their lower ends whereby the trestle may assume an almost flat initial position in which it can be placed under a car, whereafter the trestle sides may be swung up by means of said adjustment means so as to raise a car supporting structure mounted adjacent the top of the trestle. This structure may easily be tiltably secured to the top of the trestle and be provided with means operable to adjust its angular position and thereafter maintain the selected angular position.

Figure 2:
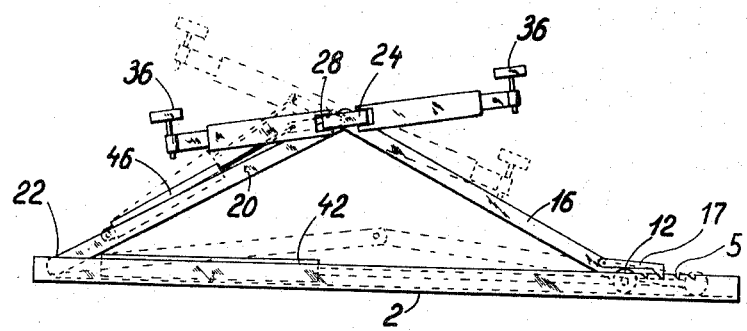

In the following the invention is further described, by way of example, with reference to the accompanying drawing, in which:

FIG. 1 is a perspective view of one embodiment of an apparatus according to the invention, whilst FIG. 2 is a side view thereof.

The apparatus shown comprises a basic frame structure 2 having long sides 4 and short sides 6 and 8. The long sides are provided with inwardly protruding flanges 10 serving to support a pair of rollers 12 interconnected by a shaft 14. To this shaft adjacent each end thereof, there is pivotally secured an arm 16 which extends up to another cross shaft 18 to which it is pivotally connected. Another pair of arms 20 extends between the shaft 18 and pivot points 22 at the side pieces 4 adjacent the short frame side 18.

The upper shaft 18 is at each end provided with a rigidly secured block member 24 serving as a mounting block for two opposed carrier arms 26 each being horizontally swingably hinged to the block 24 by means of brackets 28. Each arm 26 is made as a telescopic member having an outer arm portion 30 which is slidably received in the tubular inner portion 26 and at its outer end provided with a socket 32 for a vertical stem 34. At their top ends these stems 34 are provided with a supporting member 36 adapted to support a part of the under side of a car. Furthermore, the stems 34 are provided with a row of cross holes 38 adapted to receive a transverse pin 40 in any selected hole, whereby the position of the stems 34 in the sockets 32 may be adjusted, the stems simply being supported by the pins 40 resting on the top side of the sockets 32.

The lower shaft 14 is connected to the short frame side 8 by means of a hydraulic cylinder 42, and it will be understood that when the shaft 14 is moved towards, or away from the side pieces 8, the mutual angular position of the pairs of arms 16 and 20 will be changed in such a manner that the upper shaft 18 is raised or lowered, respectively. The upper shaft 18 is provided with a rigid radial arm 44, the outer end of which is connected to a lower cross rod 21 between the arms 20 by means of another hydraulic cylinder 46. When operating the cylinder 46 the arm 44 and therewith the shaft 18, the blocks 24 and the carrier arm structures 26–36 will be swung about the shaft 18 as indicated in dotted lines in FIG. 2, so that the inclination of the system may be controlled by means of the cylinder 46, whilst the height thereof is controlled by means of the cylinder 42.

The control equipment for the cylinders 42 and 46 may be located in connection with or remote from the apparatus itself. As shown in FIG. 1 it may by preference be mounted in a box 48 which is connected to the apparatus solely by means of the necessary pressure pipes or hoses 50 between a hydraulic pump inside the box and the two cylinders. Thus, the box 48 is situated outside a car standing over or lifted by the lifting apparatus. The box 48 contains an electric motor energized through a cable 52, a hydraulic pump operated by this motor, an oil reservoir, control valves for the two cylinders, and operating handles 58 for these valves.

The apparatus shown, of course, may be used as a stationary lifting apparatus even with the bottom frame substituted by a fixed installation in the floor, but according to a further feature of the invention it is possible in an easy manner to make the whole apparatus mobile by means of suitably located supporting wheels 54 of the swivel roller type. These wheels may be connected to the frame 2 by means of springs 56 adapted so as to make the entire apparatus wheel-supported when unloaded, whilst when loaded by a car the frame 2 will overcome the force of the springs and rest directly on the floor. The frame 2 may be provided with a handle 3 by means of which the unloaded apparatus may be easily moved.

In the initial position of the apparatus shown, the shaft 14 is situated close to the frame end piece 6 whereby the shaft 18 and the entire carrier system assumes a lowermost position immediately above the top edge of the frame 2. The pins 40 are retracted from the holes 38, e.g., hanging in chains not shown, so that the supporting members 36 assume a low position relatively to the sockets 32. The arm structures 26, 30 assume a horizontal position parallel to the sides 4 of the frame 2.

When it is desired to lift a car, this car is driven over the apparatus, or preferably the apparatus is moved under the car, the width of the frame 2 being smaller than (or not considerably exceeding) the transverse distance between the wheels of the car types adapted to be handled by the apparatus. Thereafter the arm structures 26, 30 are swung outwardly until the supporting members 36 assume a position underneath such parts of the car which are engageable by these members for lifting the car; according to the specific car type to be handled, it may be necessary to adjust the length of the telescopic arms 26, 30 simply by pulling out the outer arm portion 30 to the desired position. Thereafter each of the supporting members 36 are raised, until they engage the said parts of the car, and the pins 40 are put into the lowermost of the holes 38 situated above the top side of the bushings 32; now the cylinder 42 is operated so as to cause the shaft 18 to be raised whereby the car will be lifted off the ground to the desired height. In order to bring the car into a tilted position all that need be done is to operate the cylinder 46 until a convenient working position is obtained with the car being inclined forwardly or rearwardly.

As soon as the apparatus is loaded by raising the supporting members, the frame 2 will be pressed down and rest on the floor, the action of the wheel springs 56 being overcome by the weight of the car.

Experiments have shown that it is not necessary to secure or lock the outer telescopic arm portion 30 to the inner portions 26; when loaded by the car the portions 30 are not liable to slide out from or into the portions 26 when the system is tilted.

The apparatus may also be used for tilting the car in its transverse direction when placed transversely. The hoses 50 are joined to screw unions or snap couplings 51 on the front frame portion 6.

When the trestle 16, 18, 20 is being raised and lowered the cylinder 46 should be hydraulically short circuited so that it does not lock the car carrier structure to assume a fixed angular position relatively to the frame 20; the carrier structure starts its raising movement in a horizontal position, but during the raising it would be swung together with the frame 20 and thus cause the car to tilt correspondingly. However, the car cannot be tilted further than until its lower wheel pair touches the floor, so by further raising of the structure the lower carrier members 36 would go out of engagement with the car if the cylinder 46 was locked. The release or short circuiting of this cylinder is easily obtained automatically since it may be controlled by the same handle 58 with which the cylinder 42 is controlled.

The invention is not limited to the embodiment shown in the drawing. The shaft 18 may be raised above the frame 2 by means other than the raisable trestle structure shown, e.g. by one such structure in each side whereby it is possible to lift the ends of the shaft 18 to different levels, i.e., to additionally tilt the car in the transverse direction. The cylinders shown may be substituted by other driving means such as screw spindles for effecting the described movements.

The car carrier structures at each end of the shaft 18 may be substituted by a structure overhead the shaft 18 and being connected thereto e.g., by downwardly protruding tilting brackets so that the structure, suitably connected to the cylinder 46 or equivalent driving means, may tilt about the shaft 18. The car carrier structure may alternatively be tiltably supported adjacent the upper ends of upper extensions of the arms 16 (or 20) beyond the shaft 18. Furthermore the car carrier structure may be constructed so as to allow the car to be tilted additionally in the transverse direction, e.g., by means of a ball head joint or a cardanic suspension or support.

The raising and tilting movements should not necessarily be power driven; it is perfectly possible to use manually operated movements, e.g., by substituting the motor driven oil pump by a pump operated manually by swinging the handle 3 up and down as well known in connection with many ordinary automobile jacks.

In order to secure the apparatus against collapsing in case of failure in the hydraulic system there may be arranged, adjacent the wheels 12, a pawl member 17 which cooperates with a row of notches 5 in each of the rails 4, this member being manually raisable when it is desired to lower the carrier structure.

What is claimed is:

1. An apparatus for lifting and tilting vehicles, comprising: two substantially rectangular frame members pivotally interconnected along one common edge thereof, the opposite edges of said frame members being adapted to be rested on a support surface means beneath the vehicle, means for adjusting the horizontal distance between said opposite edges and for causing said same frame members to be swung up from an initial substantially horizontal position to inclined positions with said common edge raised above said support surface means, a vehicle support structure mounted on said frame members adjacent said common edge, said vehicle support structure being raised and lowered together with said common edge to cause the raising and lowering of the vehicle resting thereon, means for pivotally connecting said vehicle supporting structure with said frame members along a pivot axis parallel to said common edge, said vehicle supporting structure including vehicle carrier means disposed adjacent opposed sides of said pivot axis, and pivot control means operable for effecting pivoting of said vehicle supporting structure and therewith said vehicle carrier means to any desired angular position relative to said frame members.

2. An apparatus according to claim 1, wherein said frame members assume said initial substantially horizontal position at each side of said common edge, and wherein said means for adjusting the horizontal distance include means for urging the outer frame member ends towards each other.

3. An apparatus according to claim 1, wherein said supporting surface means includes a horizontal bottom frame means for slidably supporting at least one of said outer frame member ends.

4. An apparatus according to claim 3, wherein at least one end or side of said bottom frame means is provided with supporting wheels, and wherein resilient means are provided for maintaining said supporting wheels on a supporting structure as long as the apparatus is unloaded.

5. An apparatus according to claim 3, wherein one of said outer frame member ends is pivotally connected to said bottom frame means, a horizontal jack is provided and disposed between one end of said bottom frame means and the other of said frame member ends, and wherein an elongated flange means is provided on said bottom frame means for supporting said other outer frame member end, and wherein wheels or rollers are provided and cooperate with said flange means to facilitate the displacement of said other frame member end.

6. An apparatus according to claim 1, wherein said vehicle support structure includes a transverse shaft non-rotatably connected with said vehicle carrier means and rotatably disposed in said frame members, said shaft being provided with a radially projecting arm, and wherein a double acting length adjustable member is disposed between said radially projecting arm and a portion of said frame members.

7. An apparatus according to claim 1, wherein said vehicle carrier means include carrier block means provided on each end of said transverse shaft, two carrier arms pivotally secured to each carrier block means, said carrier arms being pivotal in a common substantially horizontal plane.

8. An apparatus according to claim 7, wherein each of said carrier arms are bi-partite and are telescopically length adjustable, each of said carrier arms being provided with upwardly projecting vehicle support means disposed at their respective outer ends, and wherein means are provided for adjusting each of said support means relative to said carrier arms.

9. An apparatus according to claim 1, wherein said pivot control means are operable to passively allow pivoting of said vehicle support structure during raising and lowering of said frame members relative to said support surface.

10. An apparatus according to claim 1, wherein said means for adjusting the horizontal distance between the opposite edges said frame members and said pivot control means are constituted by hydraulic cylinders.

11. An apparatus according to claim 1, wherein said pivot axis is defined by a transverse shaft which constitutes the pivotal connection between said frame members.

* * * * *